US008245448B2

(12) United States Patent
Crane et al.

(10) Patent No.: US 8,245,448 B2
(45) Date of Patent: Aug. 21, 2012

(54) DOOR PLUG

(75) Inventors: Cinda J Crane, Clarksville, IA (US); Gregg Weinberg, Plainfield, IA (US)

(73) Assignee: Rubber Development Inc., Waverly, IA (US)

( * ) Notice: Subject to any disclaimer, the term of this patent is extended or adjusted under 35 U.S.C. 154(b) by 227 days.

(21) Appl. No.: 12/647,784

(22) Filed: Dec. 28, 2009

(65) Prior Publication Data

US 2010/0166524 A1 Jul. 1, 2010

Related U.S. Application Data

(60) Provisional application No. 61/141,430, filed on Dec. 30, 2008.

(51) Int. Cl.
*F16B 39/24* (2006.01)

(52) U.S. Cl. .......................................... 49/380; 206/325

(58) Field of Classification Search .................... 49/380, 49/503, 504; 206/325; 411/433, 437
See application file for complete search history.

(56) References Cited

U.S. PATENT DOCUMENTS

| | | | | |
|---|---|---|---|---|
| 2,730,773 | A * | 1/1956 | Logue | 49/380 |
| 3,593,458 | A | 7/1971 | Wahlfeld et al. | 49/380 |
| 4,483,101 | A | 11/1984 | Berzina | 49/380 |
| 4,934,889 | A * | 6/1990 | Kurosaki | 411/433 |
| 5,159,782 | A | 11/1992 | Sales | 49/380 |
| 5,209,017 | A | 5/1993 | Ridge | 49/380 |
| 5,301,989 | A | 4/1994 | Dallmann et al. | 292/142 |
| 5,562,315 | A | 10/1996 | Sales | 292/150 |
| 5,722,203 | A | 3/1998 | Staples et al. | 49/380 |
| 5,787,639 | A | 8/1998 | Lamore, Jr. | 49/380 |
| 5,816,762 | A * | 10/1998 | Miura et al. | 411/433 |
| 5,884,367 | A * | 3/1999 | Teagno et al. | 24/16 PB |
| 5,926,921 | A * | 7/1999 | Benoit | 24/16 PB |
| 6,155,762 | A * | 12/2000 | Courtin | 411/512 |
| 6,170,198 | B1 | 1/2001 | Staples et al. | 49/380 |
| 6,240,602 | B1 * | 6/2001 | Geiger | 24/16 PB |
| 6,725,604 | B1 | 4/2004 | Vanderpan | 49/380 |
| 7,008,160 | B2 * | 3/2006 | Kanie | 411/433 |
| 7,118,143 | B2 | 10/2006 | L'Heureux et al. | 292/175 |
| 7,121,045 | B2 | 10/2006 | Massey et al. | 49/380 |
| 7,179,038 | B2 * | 2/2007 | Reindl | 411/433 |
| 7,213,371 | B1 | 5/2007 | Vanderpan | 49/380 |
| 7,320,571 | B2 * | 1/2008 | Kanie | 411/433 |
| D570,209 | S | 6/2008 | Hagleitner | D8/499 |
| 2004/0060241 | A1 * | 4/2004 | Staples et al. | 49/380 |
| 2004/0140406 | A1 * | 7/2004 | Kanie | 248/73 |
| 2004/0141828 | A1 * | 7/2004 | Kanie | 411/437 |
| 2004/0141829 | A1 * | 7/2004 | Maruyama et al. | 411/437 |
| 2005/0102906 | A1 * | 5/2005 | Massey et al. | 49/380 |

* cited by examiner

*Primary Examiner* — Katherine W Mitchell
*Assistant Examiner* — Justin Rephann
(74) *Attorney, Agent, or Firm* — Brinks Hofer Gilson & Lione

(57) ABSTRACT

A door plug for securing a pre-hung door in a fixed, closed position relative to a door jamb assembly during shipping, delivery, and/or installation is provided. The door plug includes a bolt member and a fastener. The bolt member can include a collar and a shaft extending from the collar. The shaft can include a bore along a longitudinal axis and a first engaging portion distributed along the bore. The fastener can include a head and a shank extending from the flange. The shank can extend into the bore of the bolt member for sufficient engagement between the first and second engaging portions. The fastener and the bolt member are adapted to permit the fastener to be slidably inserted into the bore of the bolt member in a longitudinal direction without screwing, and adapted to inhibit the fastener from being pulled from the bore in an opposite longitudinal direction.

14 Claims, 8 Drawing Sheets

DOOR PLUG

CROSS-REFERENCE TO RELATED APPLICATIONS

This application is related to and claims priority to and all benefits from U.S. Provisional Application Ser. No. 61/141,430 filed on Dec. 30, 2008, which is incorporated by reference in its entirety.

BACKGROUND

The present invention is directed to doors that are pre-hung on door jamb assemblies and, in particular, to a door plug to maintain the door in a fixed, closed position relative to the door jamb assembly during shipping, delivery, and/or installation.

Doors are often supplied for use in the building industry as pre-hung door assemblies. Such an assembly typically includes a door and a door jamb assembly. The door jamb assembly is composed of two vertical side jambs, a hinge jamb and a strike jamb, and a header fitted across the top between the two side jambs. The door jamb assembly may also include a sill member fitted across the bottom between the two side jambs. The hinge jam is typically machined to accommodate two or three hinges which connect the door to the hinge jamb. The strike jamb is typically machined to accept a striker plate and milled to create a strike bore to accept a latch bolt. The door is also machined to accept a lock set via the milling of a face bore and an edge bore in the body of the door. Hinges are installed to attach the door to the hinge jamb, but the door is typically not fitted with the knobs, striker plates, latch, or other hardware.

Because the door is attached to the door jamb assembly at one edge by the hinges without any restraining latch hardware installed at an opposite edge, the door is free to swing in and out of the door jamb assembly. When the door is allowed to move relative to the door jamb assembly, the door is likely to rub against the strike jamb causing damage to both the door and the strike jamb. It is desirable, therefore, to secure the door in a closed position relative to the door jamb assembly to inhibit damaging the door and the door jamb assembly and to reduce any difficulties associated with handling an unsecured door during shipping, delivery, and installation.

Several known methods have been employed to fix the door in a closed position relative to the door jamb assembly for shipping, delivery, and/or installation. One common method is to drive a nail through the strike jamb and into the edge of the door. Another common method is to nail or staple plastic straps or inserts to the door and the door jamb. These types of methods are undesirable because such nails or staples must be removed prior to installation of the door assembly leaving holes in the door and the strike jamb that later must be filled, sanded, and finished. Because the nails or staples must be removed prior to installation of the door assembly, manufacturers who use such methods rarely square the door in the door jamb assembly prior to shipping the door assembly from the manufacturing facility. Once the nails or staples are removed at the construction site, the door must be squared in the door jamb assembly by an installer. The process of squaring the door in the door jamb assembly is time consuming for the installer and typically requires more than one person to complete. Additionally, the nails or staples may occasionally cause the strike jamb or the edge of the door to split.

Other retaining devices have been provided to fix the door in a closed position relative to the door jamb assembly during shipping, delivery, and/or installation. These devices eliminate the holes in the door and door jamb assembly that must be repaired at the construction site. However, most of these devices have parts that must be screwed together at the manufacturing facility prior to shipping the door assembly. This step requires additional labor and manufacturing time. Thus, there remains a need for a device to secure the door in a closed position relative to the door jamb assembly which may be installed quickly at the door assembly manufacturing facility.

SUMMARY

A door plug for securing a pre-hung door in a fixed, closed position relative to a door jamb assembly is provided. In one aspect, the door plug can include a bolt member and a fastener. The bolt member can include a collar and a shaft extending from the collar. The collar can be sized greater than an edge bore of the door, and the shaft is sized to be inserted into the edge bore. The length of bolt member shaft can extend past the lateral edge of the door and into the strike bore of the strike jamb assembly. The shaft can include a bore disposed therein along a longitudinal axis. The fastener can include a head and a shank extending from the head. The head can be sized greater than the shaft bore, and the shank is sized to be inserted into the shaft bore. The bolt member includes a first engaging portion, and the fastener includes a second engaging portion engageable with the first engaging portion of the bolt member. The bolt member shaft is positionable within the edge bore of the door, and the fastener shank is adapted to slidably insert into the bore of the bolt member. The first and second engaging portions engage sufficiently to inhibit the fastener shank from being pulled out of the bolt member bore and to secure the door in a closed position relative to the door jamb assembly.

In one embodiment, the bolt member has a resilient engageable member for engaging the fastener. The first engaging portion of the bolt member includes one or more resilient engaging protrusions distributed about the shaft bore and extending radially inward into the bolt member bore. The second engaging portion preferably includes a threaded portion disposed along the fastener shank. In one example, the one or more resilient engaging protrusions can be a plurality of resilient pawls distributed about the shaft bore and extending radially inward into bore. In another example, the one or more resilient engaging protrusions can be a plurality of engageable members and a resilient band circumferentially disposed around the engageable members. The engageable member can have an outer surface and an arcuate inner surface with a threaded portion. Each of the engageable members can be circumferentially spaced from one another such that the arcuate inner surfaces of the engageable members form a threaded opening in alignment with the bore of the shaft. The resilient band is engageable with a portion of the outer surfaces of the engageable members.

The first engaging portion in an initial position preferably forms an opening sized smaller than the fastener. To illustrate with one embodiment, the fastener is capable of moving the resilient engaging protrusions radially outward temporarily away from the initial position during insertion of the fastener into the bolt member bore. After insertion, the resilient engaging protrusions can move radially inward to a retaining position for maintaining sufficient engagement with the threaded portion of the fastener shank to inhibit the fastener from being pulled out of the bolt member. Thus, after being temporarily moved radially outward during insertion of the fastener into the bolt member, the resilient engaging protrusions are capable of returning to the retaining position to apply a radially compressive force to the fastener.

In the one example where the one or more engaging protrusions include a plurality of resilient pawls, the resilient pawls can be pivotably attached to a portion of the shaft of the bolt member and can extend longitudinally into an intermediate spacing defined between a first portion and a second portion of the shaft. Each of the resilient pawls preferably includes an engageable tip member that is configured to fit within a notch defined between threads of the threaded portion of the fastener. The engageable tip member can have a first side and a second side sized and shaped similarly to the respective first and second sides of the threaded portion.

In the one example where the one or more engaging protrusions include a plurality of engageable members having the arcuate inner surface with the threaded portion, the fastener shank urges the engageable members to move radially outward in order to cause the resilient band to radially expand temporarily during slidable insertion of the fastener shank into the threaded opening formed by the arcuate inner surfaces. The resilient band is adapted to apply a radially compressive force to the engageable members to maintain sufficient threaded engagement with the threaded portion of the fastener after insertion into the bolt member so that the fastener is inhibited from being pulled out of the bolt member after insertion.

Yet, in another embodiment, the fastener has a resilient engageable member for engaging the bore of the bolt member. Here, the first engaging portion of the bolt member preferably includes a threaded portion disposed along the shaft bore. The second engaging portion can include a threaded portion disposed along a resilient shank. The second engaging portion may alternatively include an engageable tip member at the end of one or more resilient pawls that forms the shank of the fastener, where the resilient pawls extend from the fastener head. The second engaging portion in an initial position preferably form an opening sized greater than the bore of the bolt member. To illustrate with one embodiment, the bore of the bolt member is capable of moving the resilient shank radially inward temporarily away from an initial position during insertion of the fastener into the bolt member bore. The resilient shank is then capable of moving radially outward to a retaining position to maintain sufficient engagement with the threaded portion of the bore of the bolt member shaft to inhibit the fastener from being pulled out of the bolt member. Thus, after being temporarily moved radially inward during insertion of the fastener into the bolt member, the resilient shank is capable of returning to the retaining position to apply a radially expansive force along the bore of the bolt member.

A method of securing a pre-hung door to a door jamb assembly with any of the embodiments of the door plug described herein is provided. The pre-hung door is preferably square in the door jamb assembly prior. The door plug may be installed in the door and door jamb assembly to secure the door in a closed position relative to the door jamb assembly during shipping, delivery, and/or installation. The shaft of the bolt member is inserted into the edge bore of the door via the face bore of the door. Typically, the bolt member will be pushed until the collar contacts an inner peripheral surface of the face bore. The shank of the fastener is slidably inserted through the strike bore via the back side of the strike jamb and into the bore of the bolt member shaft by pushing the fastener shank into the bolt member without screwing. The fastener is pushed generally until the head contacts the back side of the strike jamb or the end of the bolt member. The second engaging portion of the fastener engages the first engaging portion of the bolt member to inhibit the fastener shank from being pulled out of the bore of the bolt member shaft and to secure the door to the door jamb assembly. Of course, the fastener may be screwed into the bolt member especially for a final tightening adjustment, and the fastener can be removed by unscrewing the fastener in an untightening direction.

With the various embodiments described herein, the fastener shank is permitted to be slidably inserted into the bolt member bore in a first direction without being screwed within the bolt member. This permits the installer to secure a pre-hung door, preferably previously squared in the door jamb assembly, rather quickly in a closed position relative to the door jamb assembly at the door assembling manufacturing facility without the time consuming steps of screwing the fastener into the bolt member and/or attaching other fasteners, such as nails or screws, between the strike jamb and the door. Further, the fastener shank is locked or essentially fixed within the bore because of the sufficient engagement between the bolt member and the fastener, which inhibits the fastener from sliding out of the bolt bore in a second direction, opposite the first direction, after insertion. This can inhibit the door from undesirably moving or swinging during shipping, delivery, and/or installation to avoid substantial damage to the door. At the installation site, the door plug can be quickly and easily removed from the pre-hung door, preferably squared, by unscrewing the fastener from the bolt member.

The above, as well as other advantages of the present invention, will become readily apparent to those skilled in the art from the following detailed description of a preferred embodiment when considered in the light of the accompanying drawings.

DESCRIPTION OF PREFERRED EMBODIMENTS

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue. The term "substantially" is further utilized herein to represent a minimum degree to which a quantitative representation must vary from a stated reference to yield the recited functionality of the subject matter at issue.

Figure 1:
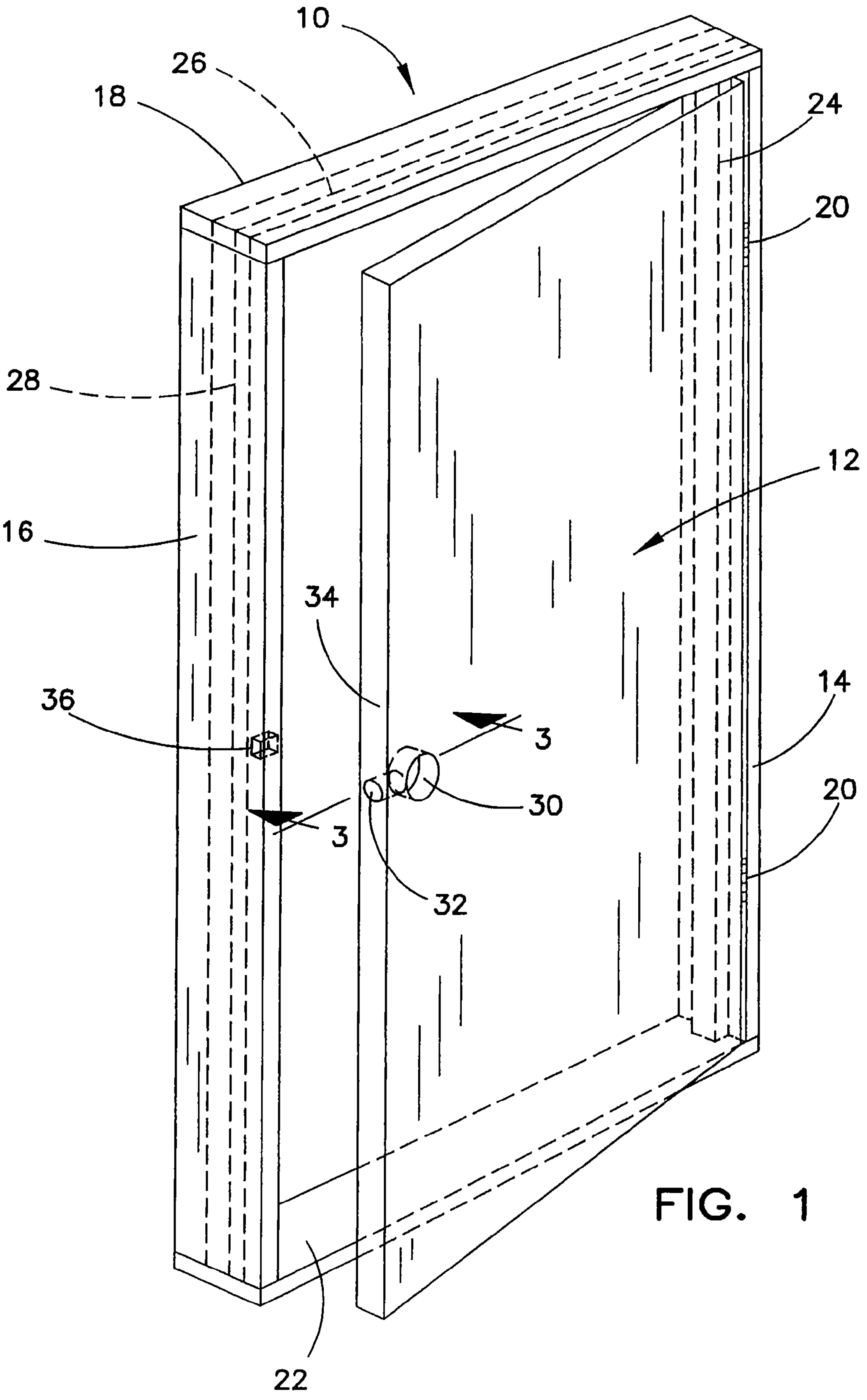
FIG. 1 is a perspective view of a door pre-hung in a door jamb assembly.

FIG. 1 illustrates a door jamb assembly 10 and a door 12 that is shown in a partially open position. The door jamb assembly 10 includes a hinge jamb 14 and a strike jamb 16 disposed along the vertical, lateral edges of the door 12. A header 18 interconnects the top of the vertical jambs 14 and 16. The door 12 is coupled to the hinge jamb 14 by one or more hinges 20, with the hinges 20 being set into the edge of the door 12 and the hinge jamb 14 in a conventional manner. As illustrated, an optional sill member 22 can temporarily be provided to interconnect the bottom of the vertical jambs 14 and 16, which is generally utilized on heavier exterior doors. Conventional door stop moldings 24, 26, 28 are fitted to the inside surface of the door jamb assembly 10 as shown. This may also be a rabbitted door frame as used on exterior door units.

The door 12 and strike jamb 16 are prepared for mounting a conventional door knob and lock assembly. The door 12 includes a face bore 30 extending through the thickness of the door and an edge bore 32 extending from a lateral edge 34 of the door 12 into the face bore 30. The face bore 30 has been standardized by the industry at 2.125-inch diameter and is backset from the edge 34 of the door 12 to center of the edge bore 30 at a distance of either 2.375 inches or 2.75 inches. The edge bore 32 preferably is cylindrical hole, which has been standardized at 1-inch diameter, and is in communication with the face bore 30. The strike jamb 16 includes a strike bore 36 strategically positioned to be substantially aligned with the edge bore 32 when the door 12 is in a closed position with reference to the door jamb assembly 10. The strike bore 36 can also be a 1-inch diameter, but preferably is partially cylindrical with flattened portions, e.g., for at 0.75×1-inch bore, and is in communication with the edge bore 32 when the door is in the closed position. The above referenced sizes are non-limiting and variations of the sizes would not depart from the scope of the present invention.

Figure 2:
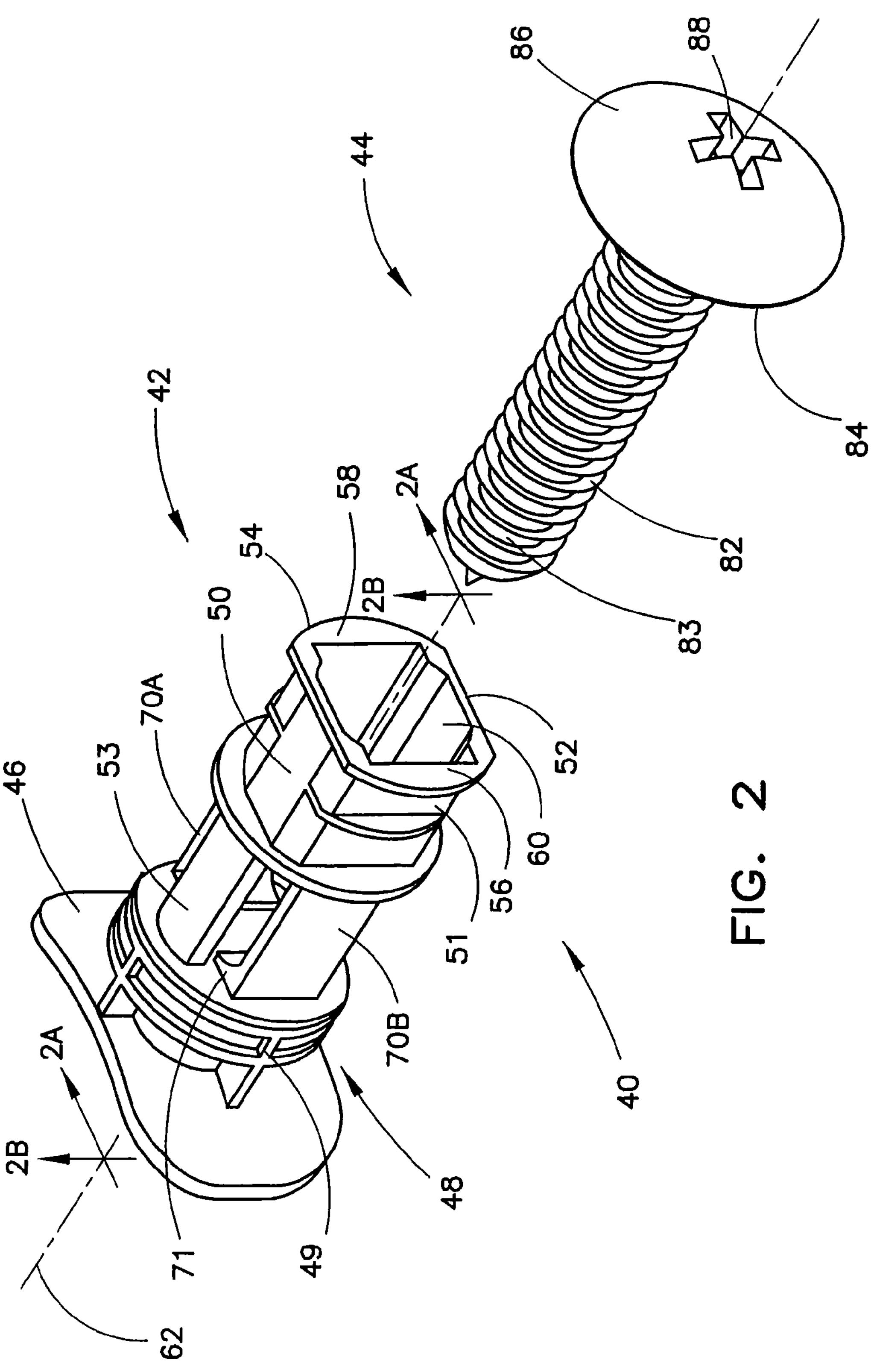
FIG. 2 is a perspective view of one embodiment of a door plug.
Figure 3:
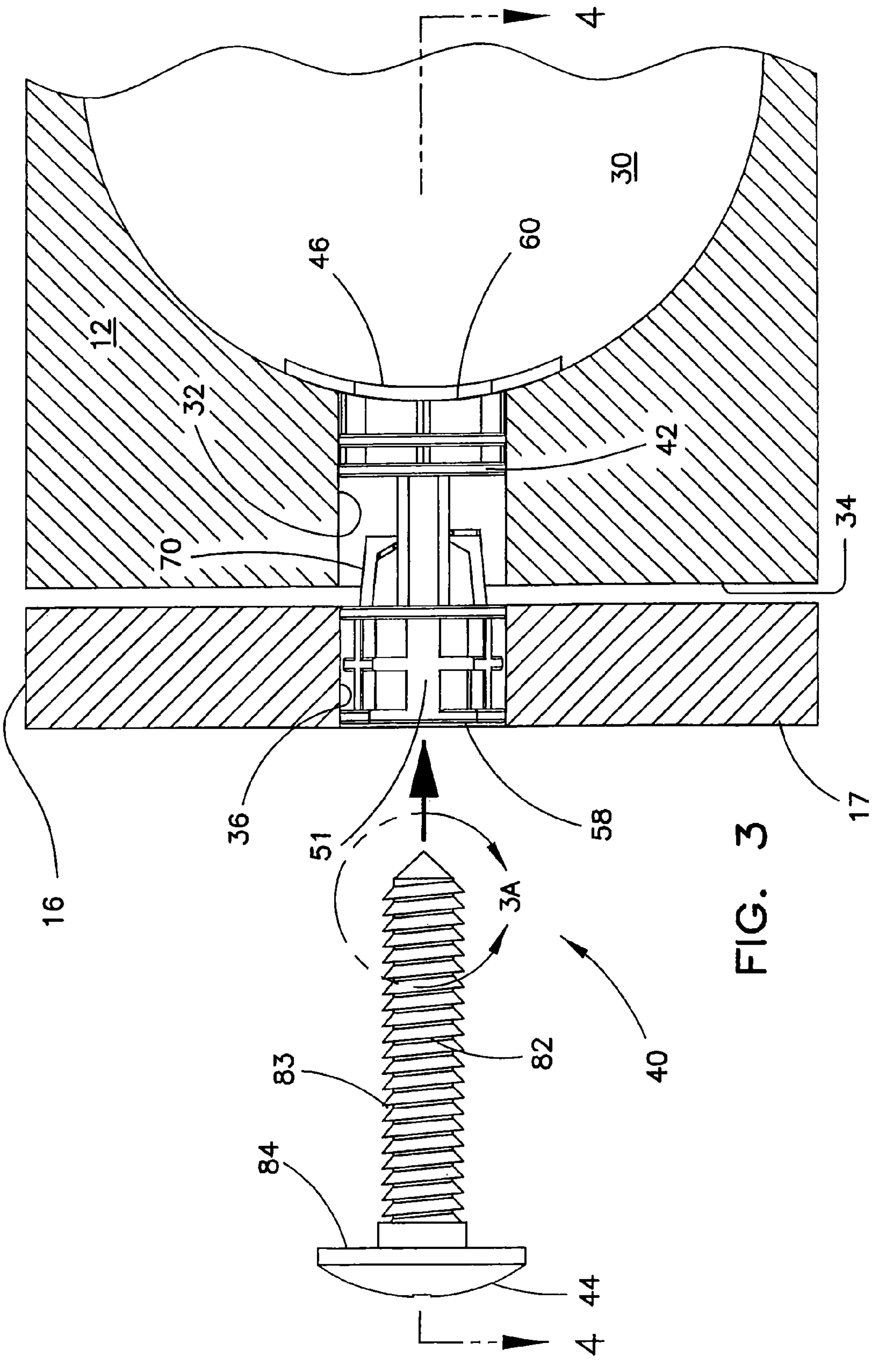
FIG. 3 is a partial view of the door of FIG. 1 taken along line 3-3 thereof, depicting an installation of a threaded fastener and a bolt member of the door plug.

FIG. 2 depicts a door plug 40 configured to retain and secure the door 12 in the closed position relative to the door jamb assembly 10 during shipping, delivery, and/or installation. The combination of the door plug 40 and the door jamb assembly 10 can inhibit damage of the door 12 and the door jamb assembly 10 and reduce any difficulties associated with handling an unsecured door during shipping, delivery, and/or installation. The door plug 40 includes a bolt member 42 and a fastener 44. As shown in FIG. 3, the bolt member 42 is installed in the edge bore 32 of the door 12 and extends into the strike bore 36 of the jamb 16 and acts as a temporary latch to secure the door 12 in the closed position. The fastener 44 is inserted through the strike bore 36 and the edge bore 32 and is securably engageable with the bolt member 42 to inhibit any relative movement between the door 12 and door jamb assembly 10.

FIG. 2 shows the bolt member 42 of the door plug 40 that is sized and shaped to extend through the edge bore 32 and into the strike bore 36. The length of the bolt member 42 can be sufficient to extend beyond the edge 34 of the door 12 when installed in order to be received in the strike bore 36 of the strike jamb 16. The overall length of the bolt member 42 however can be limited in order for the bolt member 42 to be pivoted into alignment with the edge bore 32 during insertion into the face bore 30. FIG. 3 shows the length of the bolt member 42 extending past the edge 34 of the door 12 just short of the back side edge 17 of the strike jamb 16. The tightening of the fastener 44 with the bolt member 42 can bring the flange 84 closer and sometimes against the end 58 of the bolt member thereby forcing or flexing the strike jamb 16 closer to the edge 34 of the door 12. The bolt member 40 includes a collar 46 and a shaft 48. The collar 46 is dimensioned to be greater than the cross-section of the edge bore 32 in order to limit the entry of the bolt member 42 into the edge bore 32. The collar 46 preferably includes an arcuate cross-section, or has a concave curvature, similarly shaped to an inner peripheral surface of the face bore 30. The width of the collar 46 is sized to be smaller that the width of the door 12 such that the collar 46 does not extend beyond the face of the door 12.

The shaft 48 extends from the collar 46 and is generally shaped as a cylindrical body having portions with cross-sections sized to correspond closely to the cross-section of the edge bore 32 and the strike bore 36. In one example, the shaft 48 can include a first portion 49 that is preferably dimensioned similarly to the cross-section of edge bore 32. A second portion 51 of the shaft 48 is preferably dimensioned similarly to the cross section of the strike bore 36. The second portion 51 is shown in FIG. 2 to be partially cylindrical, having parallel chordal sides 50, 52 each connecting with opposed arcuate sides 54, 56. The arcuate sides 54, 56 have a common center axis, i.e., the longitudinal axis 62 of the bolt member 42, and can have a radius corresponding closely to the radius of the arcuate portion of the strike bore 32. The distance between the parallel sides 50, 52 can correspond closely to the width of the strike bore 34 in the strike jamb 16. The first and second portions 49, 51 can be connected by one or more longitudinal members 53, which are disposed suitably to allow a spacing between the first and second portions 49, 51 and to decrease the amount of material of the shaft 48. The first and second portions may also contain ribbed portions to provide strength along the bolt member.

A bore 60 sized to receive the fastener 44 is provided in the end 58 of the bolt member 42. The bore 60 can extend along the longitudinal axis 62 of the bolt member 42 from the end 58 of the shaft 48 and through the end of the collar 46, preferably through the center of the shaft. The bolt member 42 further comprises one or more resilient engaging protrusions distributed about the shaft bore and extending radially inward into bore. The fastener 44 is capable of moving the resilient engaging protrusions radially outward temporarily away from an initial position during insertion of the fastener 44 into the bolt member bore 60. To this end, the fastener 44 is slidably inserted into the bolt member bore 60 without rotation, that is, by axially pushing the fastener into the bore without screwing in a tightening direction. The resilient engaging protrusion has a retaining position to maintain sufficient engagement with a threaded portion 83 of the fastener 44 after insertion into the bolt member to inhibit the fastener from being pulled out of the bolt member after insertion. The resilient engaging protrusion is capable of returning to the retaining position after being temporarily moved radially outward during insertion of the fastener into the bolt member bore to apply a radially compressive force to the fastener 44 such that the fastener is removable from the bolt member bore with rotation of the fastener in an untightening direction.

FIG. 2 depicts one embodiment of the resilient engaging protrusion as one or more pawls 70 that are distributed around the longitudinal axis 62 and extendable toward the bore 60. The pawls 70 (shown as 70A and 70B in FIG. 2) can extend from one of the second portion 51 and the first portion 49 of the shaft 48 and into the intermediate spacing between the first and second portions 49, 51 and the longitudinal members 53. Preferably, the pawls 70 are pivotably connected to the second portion 51 and are oriented such that the engageable tip member 71 of the pawl 70 faces the longitudinal axis 62, extending into the bore 60.

Figure 2A:
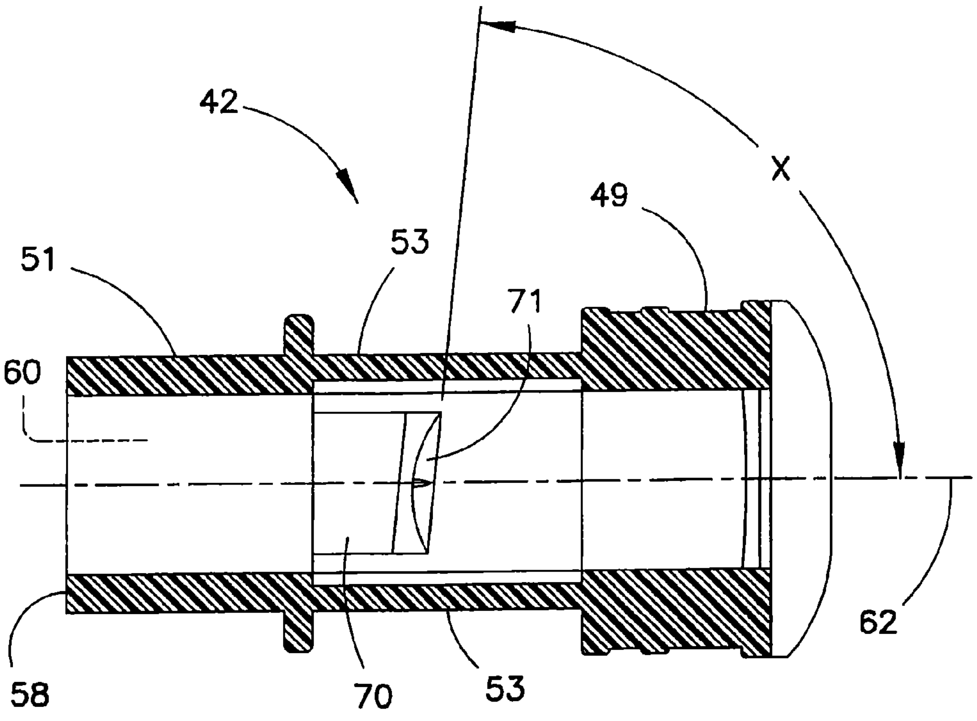
FIG. 2A is a cross-section view of a bolt member of the door plug taken along lines 2A-2A of FIG. 2.

In FIG. 2A, the end of the body of the pawl 70 where the engageable member 71 is attached is preferably angled at an angle X in the range of about 70°-90° relative to the longitudinal axis 62 to be similar, or optionally substantially identical, to the angle of the helically wound thread of the fastener 44. The portion of the engageable tip member 71 that contacts the fastener 44 is preferably arcuate sufficiently to conform around the fastener 44. The portions of the engageable tip member 71 that contact in between the threads are dimensioned similarly to the angles thereof. For example in FIG. 2B, one side of the engageable member can be tapered at an angle Y in the range of about 30°-60°, preferably about 32°-52° relative to an axis perpendicular to the longitudinal axis 62, similar to the angle Θ of the thread in FIG. 3A further described below.

Figure 2B:
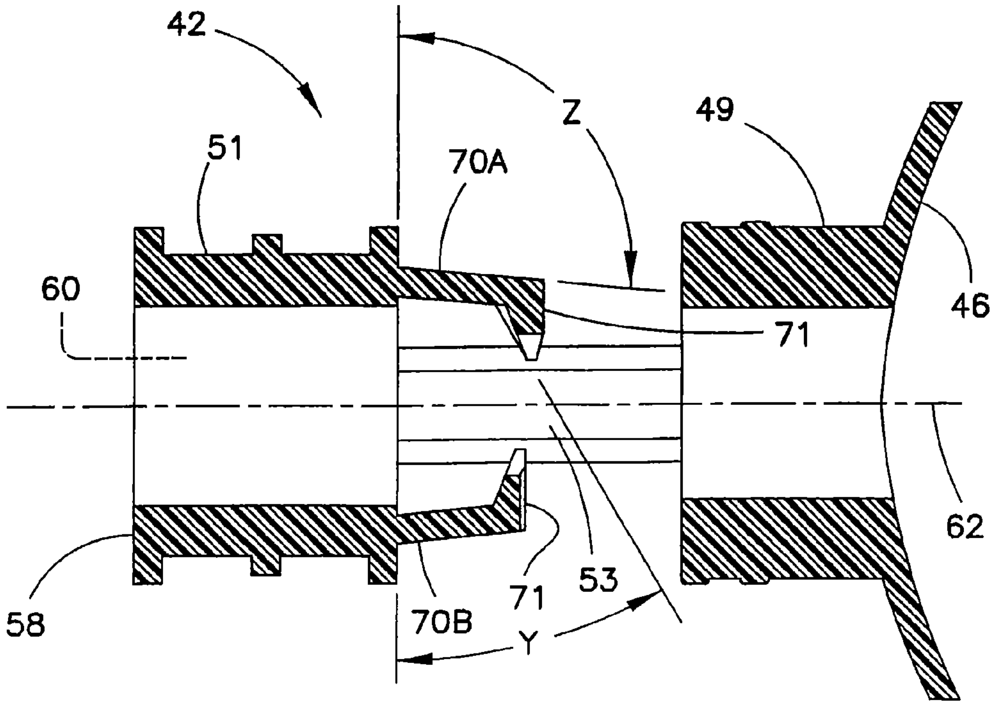
FIG. 2B is a cross-section view of a bolt member of the door plug taken along lines 2B-2B of FIG. 2.

The body of the pawl 70 is resilient for radial flexibility and/or pivotability about an attached portion to permit the fastener 44 to urge the pawls 70 to move radially outward and inward along the contours of the fastener when inserted into the bolt member. The body of the pawl 70 can be tapered inward for better contact between the engageable tip member 71 of the pawl 70 and the fastener 44. Preferably, the body of the pawl 70 is tapered at an angle Z in the range of about slightly greater than 90° to about 100°, and preferably about 95°, relative to an axis perpendicular to the longitudinal axis 62 as shown in FIG. 2B. FIG. 3 illustrates two pawls 70A, 70B disposed opposite from one another relative to the longitudinal axis 62, where the pawl 70A can have a longer length than the pawl 70B to compensate for the respective position of the helical groove of the threaded portion of the fastener 44.

In FIG. 2, the fastener 44 has a longitudinally extending shank portion 82 and a flange 84 disposed adjacent one end of the shank portion 82. The shank portion 82 is dimensioned to extend through the strike bore 36 and into the bore 60 of the bolt member 42. Preferably, a threaded portion 83 is a single thread machined helically around the shank to permit the removal or tightening of the fastener 44 relative to the bolt member 42 by rotating the fastener 44 in the respective direction. Although the shank portion 82 shown has a single thread as the threaded portion 83, the shank portion 82 can have a series of grooves formed in threaded fashion partially around the shank, longitudinally disposed so that the grooves can be engageable with the pawl 70. The pawls 70 of the bolt member 42 are configured to permit the shank portion 82 of the fastener 44 to be pushed easily into the bore 60 in a first longitudinal direction such that the flange 84 and the collar 46 come closer together. The pawls 70 are also configured to inhibit the shank portion 82 of the fastener 44 from being pulled from the bore 60 in a second longitudinal direction, opposite the first direction. The flange 84 can have a portion dimensioned larger than the cross-section of the strike bore 36 of the strike jamb 16 to inhibit the fastener 44 from extending any farther into the strike bore 36. The fastener 44 can also include a head portion 86 extending from the flange 84. The head portion 86 is configured to allow for easy removal of the fastener from the bolt member. In one example, the head portion 86 provides a convenient slot 88 for application of a driving tool such as a screw driver or the like. Other examples can include, but not limited to, the head shaped, such as a hex, for application of a wrench or socket, the head including a portion shaped for an Allen wrench or spline, and/or the head including winged portions for permitting the fastener to be turned by hand. The pawls of the bolt member and the threaded portion of the fastener are configured to rotatably engage and disengage, such that after insertion the fastener can be tightened further and/or can be loosened and/or removed from the bolt member.

Figure 3A:
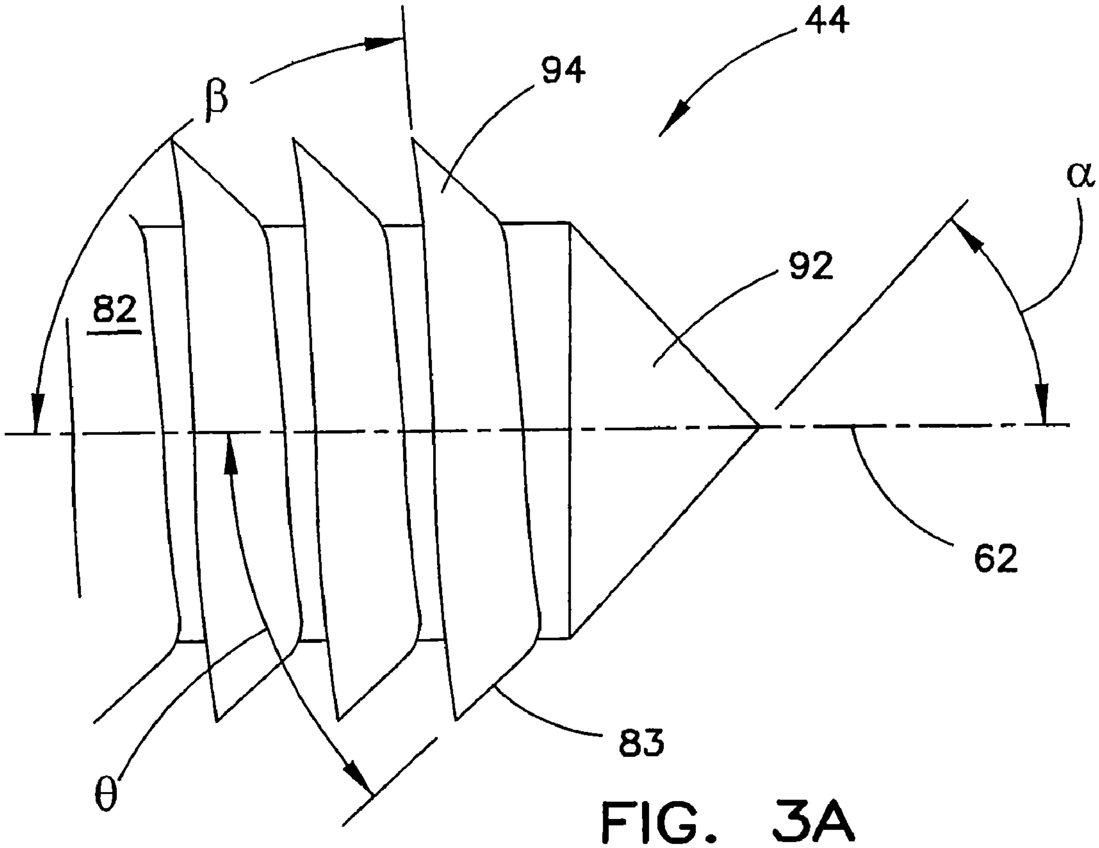
FIG. 3A is a detailed view of the end of the threaded fastener in FIG. 3.

FIG. 3A illustrates a detailed view of the end portion of the fastener 44. Although the fastener 44 preferably has 10 threads per inch, it is to be understood that the amount of threads per inch may vary depending on the application. The tip 92 can be tapered at an angle α in the range of about 40°-55° and preferably about 41.5°-51.5°, relative to the longitudinal axis 62 in order to dilate the opening formed by the pawls 70A, 70B. The thread 94 of the threaded portion 83 of the fastener 44 can be a square back thread having a complex angle. One side of the thread 94 can be angled at an angle β in the range of about 70°-90° relative to the longitudinal axis 62, which depicts the angle facing the head portion of the fastener 44. The side with the angle β can provide a physical stop to contact with a similarly angled portion of the engageable tip member 71 of the pawl 70 of the bolt member 42 to inhibit the fastener 44 from being pulled out without rotation of the bolt member 42 after being inserted. The other side of the thread 94 can have another angle Θ in the range of about 30°-60°, preferably about 32°-52°, relative to the longitudinal axis 62. The side of the thread with the angle Θ can provide smooth travel for the engageable tip member 71 of the pawl when the fastener 44 is inserted into the bolt member 42.

According to FIG. 3, the door 12 is placed in the closed position and the edge bore 32 and the strike bore 36 are axially aligned for receiving the bolt member 42. The bolt member 42 of the door plug 40 is inserted into the edge bore 32 of the door 12 through the passage afforded by the face bore 30 for extension into the strike bore 36. The bolt member 42 is inserted initially at an angle relative to the edge bore 32 with the end 58 of the bolt member 42 entering a short distance into the face bore 32. The cross-section of the second portion 51 of the shank portion 48 can provide clearance or relief for this entry and the bolt member 42 is then pivoted into alignment with the edge bore 32. During pivoting, the collar 46 preferably clears the arcuate edge of the inner peripheral surface of the face bore 30. Once inserted, the placement of the collar 46 is such that the collar can contact, or preferably is flushed, against the inner peripheral surface of the face bore 30 to maximize the length of the bolt member 42 extending from the collar 46 to the end 58, as shown in FIG. 3. The end 58 of the bolt member 42 can extend beyond the edge 34 of the door 12 and into the strike bore 36 in the strike jamb 16 of the door jamb assembly 10.

Figure 3B:
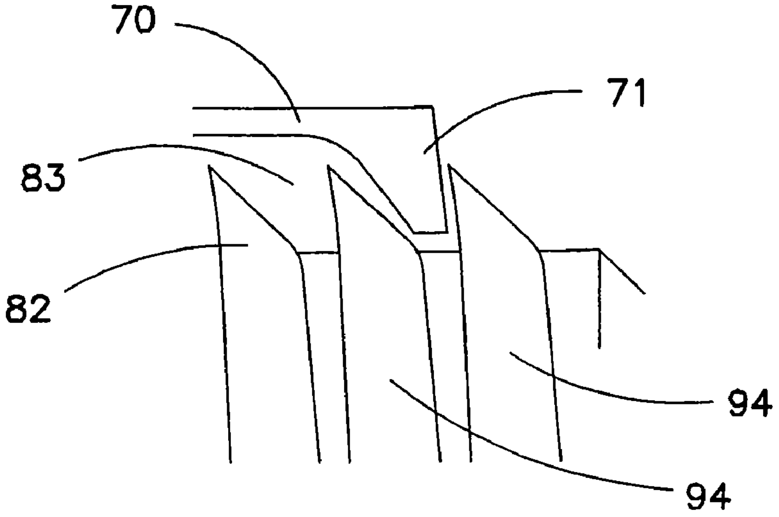
FIG. 3B is a detailed view of a pawl engaging with a threaded fastener.
Figure 4:
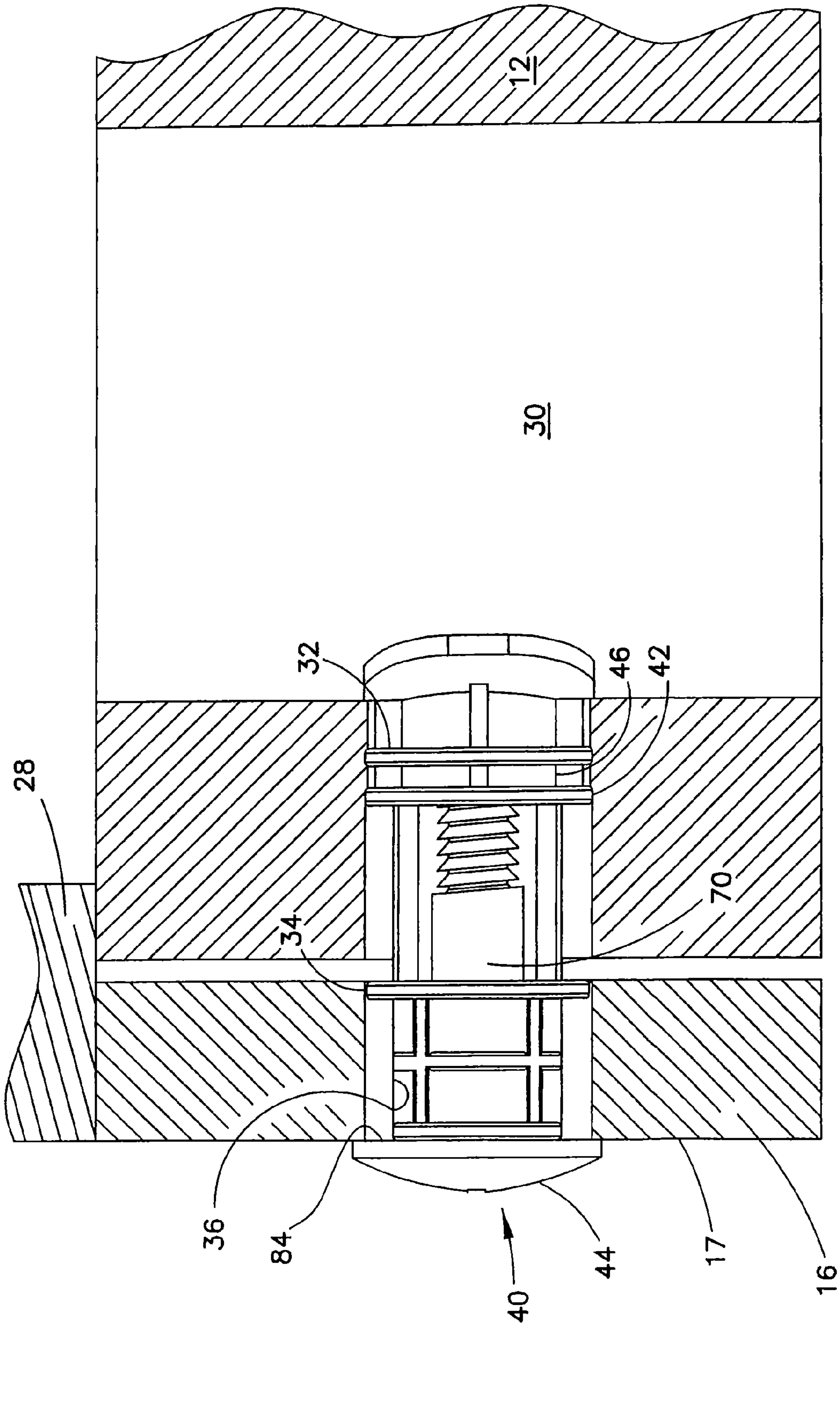
FIG. 4 is a cross-sectional view taken along lines 4-4 of FIG. 3, depicting an installed door plug.

From a back side 17 of the strike jamb 16, the shank portion 82 of the fastener 44 can then be pushed in the first longitudinal direction through the strike bore 36 and into the bore 60 of the bolt member 42 to bring the collar 46 and the flange 84 closer together. The fastener 44 can be oriented such that the flange 84 contacts the back side 17 of the strike jamb 16 and the threaded portion 83 securably engages with the pawls 70. FIG. 3B illustrates the contacting arrangement between the engageable tip member 71 of the pawl 70 and the threaded portion 83. The engageable tip member 71 is suitably dimensioned to substantially fit within the notch defined between the threads. Because of the engagement of the pawls 70 with the threaded portion 83 of the fastener 44, the shank portion 82 of the fastener 44 is inhibited from being pulled from the bore 60 of the bolt member 42 in the second opposite longitudinal direction to inhibit the flange 84 and the collar 46 from being moved farther apart. The door plug 40, with the bolt member 42 snugly fitting the edge bore 32 of the door 12 and the strike bore 36 of the strike jamb 16 and securably engaged with the fastener 44, provides a latch which secures the door 12 in a closed position relative to the door jamb assembly 10, as shown in FIG. 4. In particular, one face of the door 12 is disposed adjacent to the door stop molding 28 and the edge 34 of the door is disposed adjacent to the strike jamb 16. The engagement between the fastener and bolt member may be further tightened by rotating the fastener in a tightening direction. This can draw the strike jamb 16 into contact with the edge 34 of the door 12 to fixedly secure the door 12 to the door jamb assembly 10.

The features described herein provide aid to an installer setting the door 12 and door jamb assembly 10 in a door opening. As mentioned previously, the fastener can be removed from the bolt member by applying a suitable tool, or by hand, to the fastener and rotating the fastener in the loosening direction. The installer, upon removal of the fastener, is able to move the bolt member easily into and out of engagement with the strike bore in the strike jamb.

Figure 5:
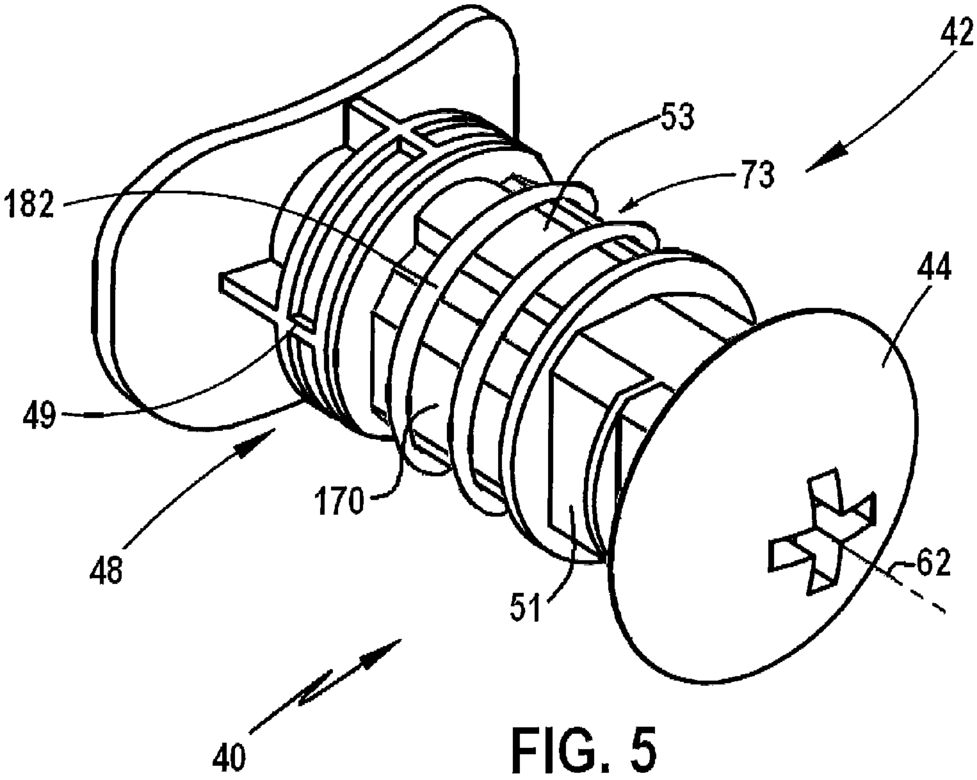
FIG. 5 is a perspective view of another embodiment of a door plug.
Figure 5A:
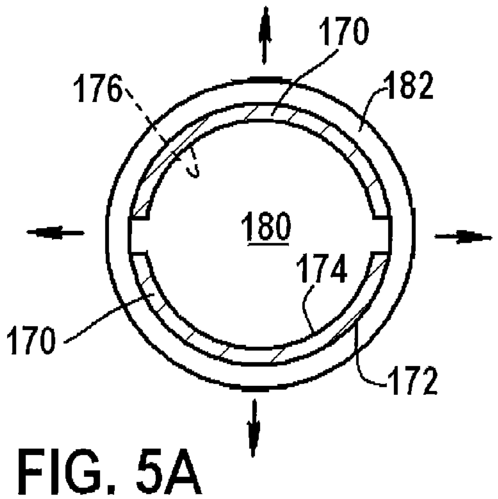
FIG. 5A is a cross-sectional view of a door plug similar to the door plug of FIG. 5.
Figure 5B:
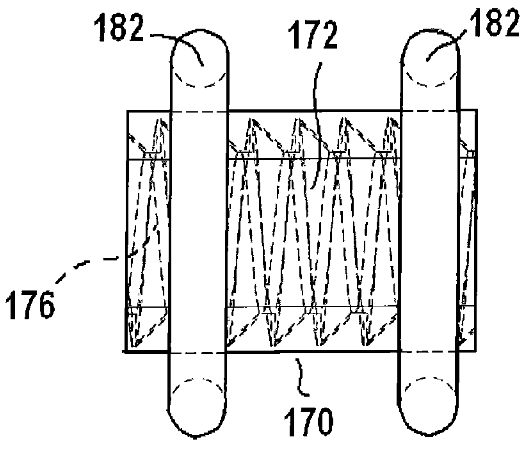
FIG. 5B is a bottom view of the door plug of FIG. 5.

FIG. 5 depicts another embodiment of the resilient engaging protrusion as a plurality of engageable members 170 for use with the door plug 40. Instead of the pawls 70, the bolt member 42 can have the engageable members 170 disposed within the spacing 73 between the first and second portions 49, 51 of the shaft 48. With reference to FIGS. 5A and 5B, the engageable member 170 has an outer surface 172 and an arcuate inner surface 174 with a threaded portion 176 sized and shaped similar to the threaded portion 83 of the fastener 44 for threadable attachment thereto. According to FIG. 5A, each of the engageable members 170 is circumferentially spaced from one another about the longitudinal axis 62 such that the arcuate inner surfaces 174 thereof form a threaded opening 180, typically cylinder-like opening, that is in axial alignment with the shaft bore.

The body of the engageable members 170 is depicted in FIG. 5B, which also depicts the threaded portion 176 formed along the inner surface. For example, the body of the engageable members 170 is formed from a segment of a divided cylinder, shown in the figures as a bifurcated cylinder, having a tapped center opening, which is longitudinally split along the walls of the cylinder. The outer surface 172 of the body can be curved similar to what is shown in FIG. 5A, or optionally can have planar surfaces, such as shown in FIGS. 5 and 5B, for better engagement with the longitudinal members 53. More than two engageable members can be used to form the threaded opening 180 so long as the members 170 are radially movable relative to one another in order for the opening 180 to receive the fastener 44, and radially movable to a retaining position shown in FIG. 5 to maintain sufficient threadable engagement with the threaded portion 83 of the fastener 44. As can be understood by persons of ordinary skill in the art, the engageable members 170 need not be divided into equally sized portions and/or need not be circumferentially spaced from one another by equal spacing.

As shown in FIG. 5, one or more resilient bands 182, such as an O-ring made of an elastic material, for example, a rubber material, can be in contact with portions of the outer surfaces 172 of the engageable members 170, preferably engaged circumferentially around the engageable members. The body of the engageable members can have a recess sized to receive the resilient bands. Although FIG. 5 shows the resilient band 182 preferably wrapped around the outer surface of the longitudinal members 53, the resilient band 182 may also be wrapped around only the engageable members 170, as shown in FIG. 5A, to fit within the spacing 73 within the longitudinal members 53. The resilient band 182 has an original hoop configuration, shown in FIG. 5A, and an elasticity to stretch radially outward temporarily and to move radially inward to return to the original hoop configuration without permanent deformation. When the engageable members 170 are positioned within the resilient band 182 in the original hoop configuration, the size of the threaded opening 180 formed by the engageable members 170 is at least less than the size of cross-section of the shank 82 of the fastener 44. To this end, when the fastener 44 is slidably inserted into the bore 60 of the bolt member 42, as well as the threaded opening 180 formed by the engageable members 170 without rotation, the fastener 44 urges the engageable members 170 to move radially outward, represented by the arrows in FIG. 5A, which causes the resilient band 182 to radially expand accordingly. After insertion, in attempt to return to its original hoop configuration, the resilient band 182 applies a radially compressive force along the outside surface portions of the engageable members 170 to move the members to a retaining position. The radially compressive force is transmitted to the fastener 44 and is sufficient to maintain threadable engagement with the threaded portion 83 of the fastener 44 in order to inhibit the fastener 44 from being pulled out of the bolt member 42 after insertion.

Figure 6:
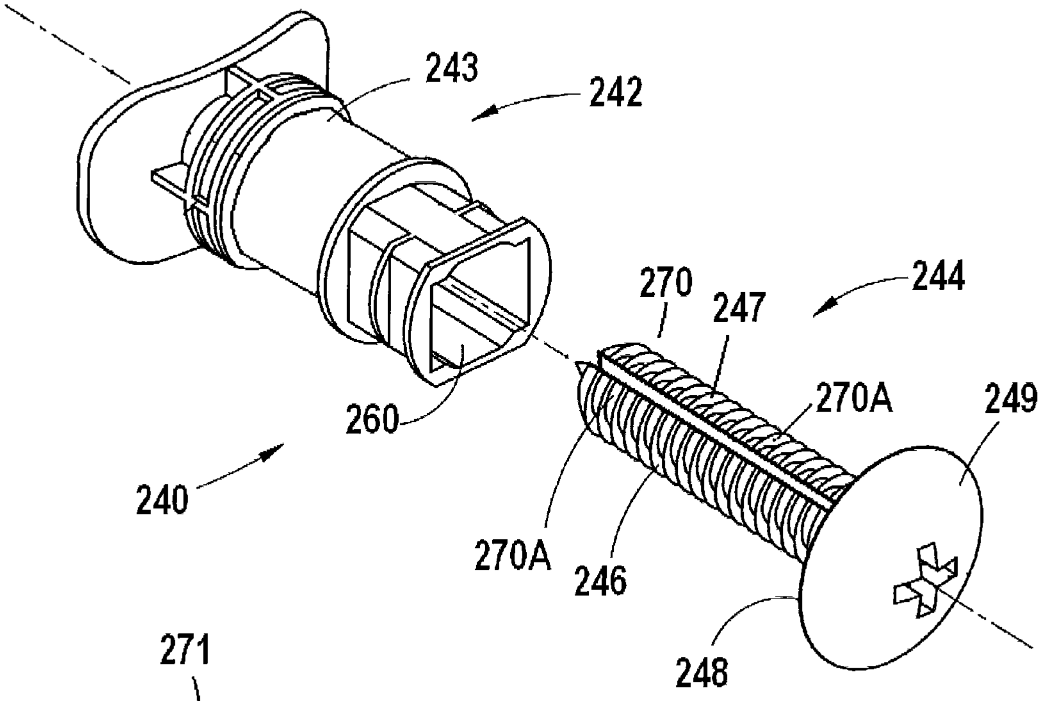
FIG. 6 is a perspective view of another embodiment of a door plug.

FIG. 6 depicts an alternative embodiment of the door plug 240, which is the substantially similar to the door plug 40, except what is described below. A portion 243 of the bolt member 242 is configured to have a threaded bore 260, tapper or molded bore with internal threads, sized and shaped similar to the threaded portion 83 of the fastener 44. An alternative fastener 244 is provided having a resilient shank 246 with one or more engageable protrusions 270 capable of engagement with the threaded bore 260 of the bolt member 242.

The resilient shank 246 longitudinally extends from the flange 248. The shank 246 is dimensioned to extend through the strike bore and into the bore 260 of the bolt member 242. The shank 246 preferably has portions removed such that the engageable protrusions 270 of the resilient shank 246 can be radially moved inward when being slidably inserted into the bore 260 in the first longitudinal direction. Once inserted, the resilient shank 246 of the fastener 244 securably engages with the threaded bore 260 of the bolt member 242 and is inhibited from being pulled from the bore 260 in the second longitudinal direction, opposite the first longitudinal direction. The fastener 244 includes a head 249 extending from the flange 248 that is configured to provide a convenient slot for application of a driving tool such as a screw driver or the like. Again, the fastener 244 can be easily pushed into the bore 260 of the bolt member 242 to engage the engageable protrusions 270. The engaging protrusion 270 of the fastener 244 has a retaining position to maintain sufficient engagement with the bore 260 of the bolt member 242 after insertion into the bolt member 242 to inhibit the fastener 244 from being pulled out of the bolt member 242 after insertion. The engaging protrusion 270 is capable of returning to the retaining position after being temporarily moved radially inward during insertion of the fastener into the bolt member bore 242 such that the fastener 244 is securely retained and removable from the bolt member bore with rotation of the fastener in an untightening direction.

FIG. 6 depicts the engaging protrusion 270 comprising the resilient shank 246 having a threaded portion 247 capable of threaded attachment with the threaded bore 260. The resilient shank 246 is formed from segments 270A of a divided threaded cylinder, shown as a bifurcated cylinder, having a longitudinal split along the walls of the cylinder. During insertion, the divided segments 270A of the resilient shank 247 flex radially inward to allow the fastener shank to be slidably inserted into the bore 260, and after fully inserted the divided segments return to the retaining position to sufficiently engage with the treaded bore.

Figure 6A:
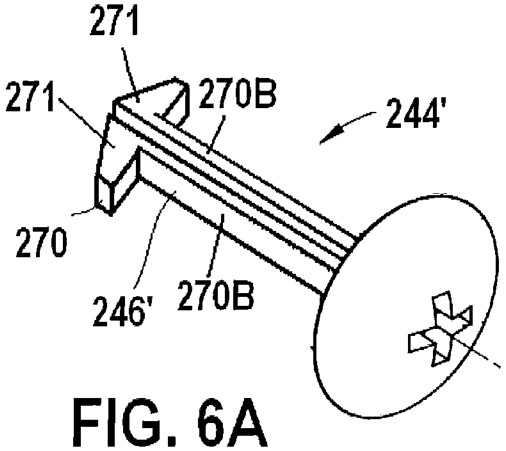
FIG. 6A is a perspective view of an alternative fastener for use in the door plug of FIG. 6.

FIG. 6A depicts an alternative fastener 244' for use with the bolt member 242, with the engaging protrusion 270 comprising resilient pawls 270B forming the resilient shank 246' and configured to engage the threaded bore 260. The resilient pawls 270B are substantially similar to the pawls 70 described herein except the engageable tip members 271 of the resilient pawls 270B are positioned radially outward. In addition, one side of the engageable tip member 271 that is initially inserted into the bore is tapered, and the opposite side has the square back. During insertion, the resilient pawls 270B flex inward to allow the fastener 244' to be pushed into the threaded bore 260 of the bolt member 242, and after fully inserted the resilient pawls 270B return to the retaining position to sufficiently engage with the threaded bore where removal is performed by rotation of the fastener in an untightening direction.

Drawings in the figures illustrating various embodiments are not necessarily to scale. Some drawings may have certain details magnified for emphasis, and any different numbers or proportions of parts should not be read as limiting, unless so-designated in the present disclosure. Those of skill in the art will appreciate that embodiments not expressly illustrated herein may be practiced within the scope of the present invention, including those features described herein for different embodiments may be combined with each other and/or with currently-known or future-developed technologies while remaining within the scope of the claims presented here. It is therefore intended that the foregoing detailed description be regarded as illustrative rather than limiting. And, it should be understood that the following claims, including all equivalents, are intended to define the spirit and scope of this invention.

The invention claimed is:

1. A door plug for securing a pre-hung door in a fixed, closed position relative to a door jamb assembly, the pre-hung door having a face bore and an edge bore in communication with one another, the door jamb assembly having a strike bore disposed in substantial alignment with the edge bore, the door plug comprising:

a bolt member having a collar and a shaft extending from said collar, the shaft dimensioned to fit within said edge bore, the shaft having a bore disposed longitudinally therein, wherein the bolt member further comprises a plurality of resilient pawls distributed about the shaft bore and extending radially inward into said shaft bore; and a fastener having a head and a shank extending from said head, the shank having a threaded portion and being dimensioned to fit within the shaft bore of the bolt member, wherein the bolt member is positionable within said edge bore, wherein the shank of the fastener is insertable slidably through said strike bore of said strike jamb into the shaft bore of the bolt member, and the threaded portion of the fastener shank is capable of engaging with at least one of the resilient pawls of the bolt member to secure said door in a closed position relative to said door jamb assembly, wherein the threaded portion of the fastener comprises external threading, the threading having a first side with a square back and a second side with a taper, wherein each of the resilient pawls further comprises an engageable tip member configured to fit within a notch defined between the first side of one thread and the second side of an adjacent thread, said engageable tip member having a first side and a second side sized and shaped similar to the respective first and second sides of said threading.

2. The door plug of claim 1, wherein the external threading is disposed helically about the shank of the fastener to allow the fastener to be rotatably tightened within the shaft bore of the bolt member in a first longitudinal direction, and rotatably removed from the shaft bore of the bolt member in a second longitudinal direction that is opposite of the first longitudinal direction.

3. The door plug of claim 2, wherein the engageable tip member of each of the resilient pawls is angled relative to a longitudinal axis of the bolt member at an angle similar to an angle of the external threading of the fastener.

4. A door plug for securing a pre-hung door in a fixed, closed position relative to a door jamb assembly, the pre-hung door having a face bore extending through the door and an edge bore extending from the face bore to a lateral edge of the door, the edge bore being disposed in substantial alignment with a strike bore of a strike jamb, the door plug comprising:

a bolt member having a collar and a shaft extending from said collar, the shaft dimensioned to fit within said edge bore, the shaft having a bore disposed longitudinally therein, the bolt member having a first engaging portion comprising one or more resilient engaging protrusions distributed about the shaft bore and extending radially inward into the shaft bore of the bolt member; and a fastener having a head and a shank extending from said head, the shank dimensioned to fit within the shaft bore of the bolt member, the fastener having a second engaging portion engageable with the first engaging portion of the bolt member and comprising external threading, wherein the bolt member shaft is positionable within the edge bore of said door, and wherein the fastener shank is slidably insertable into the shaft bore of the bolt member such that an engageable member of the resilient engaging protrusion of the bolt member engages the external threading of the fastener sufficiently to inhibit the fastener shank from being pulled out of the shaft bore of the bolt member and to secure said door in a closed position relative to said door jamb assembly, wherein the engageable member of the resilient engaging protrusion is angled relative to a longitudinal axis of the bolt member at an angle similar to an angle of the external threading of the fastener.

5. The door plug of claim 4, wherein the fastener shank is removable from the shaft bore of the bolt member with rotation of the fastener in an untightening direction.

6. The door plug of claim 4, wherein the external threading of the fastener comprises a first side comprising a taper configured to allow the fastener to be slidably inserted into the shaft bore of the bolt member in a first longitudinal direction, and a second side comprising a square back configured to inhibit the fastener from being pulled from the shaft bore of the bolt member in a second, opposite longitudinal direction.

7. The door plug of claim 6, wherein the threading is disposed helically about the shank of the fastener to allow the fastener to be rotatably tightened within the shaft bore of the bolt member in the first longitudinal direction, and rotatably removed from the shaft bore of the bolt member in the second longitudinal direction.

8. The door plug of claim 6, wherein the external threading of the fastener comprises a first thread and a second thread positioned adjacent to the first thread, the engageable member is configured to fit within a notch defined between the first side of the first thread and the second side of the second thread, and the engageable member comprises a first side sized and shaped similar to the first side of the first thread and a second side sized and shaped similar to the second side of the second thread.

9. The door plug of claim 4, wherein said resilient engaging protrusion of the bolt member is radially movable outward temporarily away from an initial position during insertion of the fastener into the shaft bore of the bolt member.

10. The door plug of claim 4, wherein said resilient engaging protrusion of the bolt member has a retaining position to maintain sufficient engagement with the threaded portion of the fastener, said resilient engaging protrusion being capable of returning to the retaining position after being temporarily moved radially outward during insertion of the fastener into the shaft bore of the bolt member.

11. The door plug of claim 4, wherein the one or more resilient engaging protrusions of the bolt member comprises a plurality of resilient pawls distributed about the shaft bore and extending radially inward into the shaft bore.

12. The door plug of claim 4, wherein the shaft of the bolt member has a first portion and a second portion, the first portion and the second portion are longitudinally spaced from one another to define a spacing therebetween, and connected to one another by one or more longitudinal members.

13. A door plug for securing a pre-hung door in a fixed, closed position relative to a door jamb assembly, the door plug comprising:

a bolt member having a collar and a shaft extending from said collar, the shaft comprising a bore disposed longitudinally therein and a plurality of resilient engaging protrusions distributed about the shaft bore and extending radially inward into said shaft bore; and a fastener having a head and a shank extending from said head, the shank comprising external threading and being dimensioned to fit within the shaft bore of the bolt member;

wherein the shank of the fastener is insertable slidably into the shaft bore of the bolt member such that the external threading of the fastener shank engages at least one of the resilient engaging protrusions of the bolt member;

wherein the external threading of the fastener comprises a first side with a square back and a second side with a taper, and a notch is defined between the first side of one thread of the external threading and the second side of an adjacent thread of the external threading; and wherein each of the resilient engaging protrusions comprises an engageable tip member configured to fit within the notch of the external threading, and the engageable tip member comprises a first side sized and shaped similar to the first side of the external threading and a second side sized and shaped similar to the second side of the external threading.

14. The door plug of claim 13, wherein the first side of the external threading of the fastener is angled at an angle between about 70 and about 90 degrees relative to a longitudinal axis of the fastener, and the second side of the external threading of the fastener is angled at an angle between about 30 and about 60 degrees relative to the longitudinal axis of the fastener.

* * * * *